United States Patent
Levey

(10) Patent No.: US 10,273,591 B2
(45) Date of Patent: Apr. 30, 2019

(54) FLUX METHOD FOR TIN AND TIN ALLOYS

(71) Applicant: Rohm and Haas Electronic Materials LLC, Marlborough, MA (US)

(72) Inventor: Peter R. Levey, Northborough, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 283 days.

(21) Appl. No.: 13/745,852

(22) Filed: Jan. 20, 2013

(65) Prior Publication Data

US 2013/0186766 A1    Jul. 25, 2013

Related U.S. Application Data

(60) Provisional application No. 61/588,986, filed on Jan. 20, 2012.

(51) Int. Cl.

| | |
|---|---|
| *C25D 9/02* | (2006.01) |
| *B23K 35/36* | (2006.01) |
| *B23K 35/362* | (2006.01) |
| *C23C 2/08* | (2006.01) |
| *C23C 2/26* | (2006.01) |
| *C23C 2/30* | (2006.01) |
| *C25D 3/32* | (2006.01) |
| *C25D 3/60* | (2006.01) |
| *B23K 35/26* | (2006.01) |
| *B23K 35/02* | (2006.01) |
| *B23K 1/20* | (2006.01) |
| *C25D 5/50* | (2006.01) |

(52) U.S. Cl.
CPC ............... *C25D 9/02* (2013.01); *B23K 1/203* (2013.01); *B23K 35/0233* (2013.01); *B23K 35/262* (2013.01); *B23K 35/362* (2013.01); *B23K 35/3618* (2013.01); *C23C 2/08* (2013.01); *C23C 2/26* (2013.01); *C23C 2/30* (2013.01); *C25D 3/32* (2013.01); *C25D 3/60* (2013.01); *C25D 5/505* (2013.01)

(58) Field of Classification Search
CPC ..... B23K 1/203; B23K 35/262; B23K 35/362

USPC ....................................................... 427/421.1
See application file for complete search history.

(56) References Cited

U.S. PATENT DOCUMENTS

| | | | |
|---|---|---|---|
| 3,749,649 A | | 7/1973 | Valayil |
| 4,113,525 A | * | 9/1978 | Stayner et al. ................. 148/23 |
| 4,181,580 A | | 1/1980 | Kitayama et al. |
| 4,413,049 A | | 11/1983 | Beaudet et al. |
| 4,482,596 A | | 11/1984 | Gulla et al. |
| 4,662,999 A | | 5/1987 | Opaskar et al. |
| 4,871,429 A | | 10/1989 | Nobel et al. |
| 4,885,064 A | | 12/1989 | Bokisa et al. |
| 5,174,887 A | | 12/1992 | Federman et al. |
| 5,427,677 A | | 6/1995 | Mosher |
| 6,409,850 B1 | * | 6/2002 | O'Driscoll et al. .......... 148/528 |
| 6,923,899 B2 | | 8/2005 | Brown et al. |
| 7,465,384 B2 | | 12/2008 | Levey et al. |
| 2006/0191797 A1 | * | 8/2006 | Levey et al. .................. 205/252 |
| 2008/0283407 A1 | | 11/2008 | Martyak et al. |
| 2009/0042382 A1 | * | 2/2009 | Hawkey ........................ 438/613 |

FOREIGN PATENT DOCUMENTS

| | | |
|---|---|---|
| EP | 1696052 A2 | 8/2006 |
| JP | S5114139 A | 2/1976 |
| JP | 03481378 B2 | 1/1996 |
| WO | 9813538 A1 | 4/1998 |
| WO | 20040101860 A1 | 11/2004 |
| WO | 2007078655 A2 | 7/2007 |

OTHER PUBLICATIONS

European Search Report of corresponding European Application No. 13 15 1765, dated May 21, 2013.

\* cited by examiner

*Primary Examiner* — Alexander M Weddle
(74) *Attorney, Agent, or Firm* — John J. Piskorski

(57) ABSTRACT

A flux composition which includes one or more organic compounds including one or more sulfonic acid groups, salts or anhydrides thereof is applied to tin or tin alloy deposits. The flux composition is then homogenized on the tin or tin alloy to inhibit tin or tin alloy oxidation and improve brightness of the tin or tin alloy.

6 Claims, No Drawings

FLUX METHOD FOR TIN AND TIN ALLOYS

This application claims the benefit of priority under 35 U.S.C. § 119(e) to U.S. Provisional Application No. 61/588,986, filed Jan. 20, 2012, the entire contents of which application are incorporated herein by reference.

FIELD OF THE INVENTION

The present invention is directed to an improved flux method for tin and tin alloys where the flux composition includes organic compounds including one or more sulfonic acid groups, salts or anhydrides thereof and inorganic acids. More specifically, the present invention is directed to an improved flux method for tin and tin alloys where the flux composition includes organic compounds including one or more sulfonic acid groups, salts or anhydrides thereof and inorganic acids and is applied to the tin or tin alloy in uniform amounts per unit area to inhibit tin and tin alloy oxidation and improve surface properties.

BACKGROUND OF THE INVENTION

Iron containing substrates such as strip steel may be electroplated with tin in large continuous plating machines at steel mills throughout the world. In such machines a large coil of steel sheet unwinds at one end of the machine and proceeds through cleaning and acid pickling stations followed by multiple tin electroplating stations to produce a tin deposit over the steel surface. The tin coating, as plated, exhibits a characteristic smooth matte surface.

The next section of the line is variously known as the "flow-melting", "flow-brightening", or "reflow" section. The reflow operation is used to transform the matte deposit to the bright reflective finish typical of tinplate and to produce a thin iron-tin compound layer at the interface between the tin coating and the steel base, thereby improving corrosion resistance. The operation includes the steps of raising the temperature of the tin coating to above the melting point of tin, followed by immediate quenching to impart and achieve the desired properties of the deposit.

In the reflow operation, after the matte tinplate is rinsed, the steel sheet proceeds through a fluxing station. The term "flux" in this context refers to a substance that aids, induces, or actively participates in fusing or flowing. The application of flux is followed by drying and the reflow station itself raises the temperature of the steel to above the melting point of tin. The steel is then quickly quenched in water resulting in a tin surface that has a bright finish. After reflow the steel proceeds through other stations for treatments such as passivation, oiling and rewinding or cutting into sections at the exit-end of the machine.

A uniform, bright finish is achieved without blemishes or discontinuities if all of the above steps are optimally executed otherwise tin oxides or hydroxides as well as "woodgrain" form on the tinplate surface. Woodgrain is a common visual defect that can occur in conduction reflowed tinplate when light tin coating weights are produced in which the surface takes on a non-uniform appearance analogous to that of polished wood. The formation of tin oxides and hydroxides may cause defects in the tin finish during reflow. This defect is observable on the surface of the tin as a white haze. Another common defect is a blue haze caused by acid etching of the tinplate due to over application of a fluxing compound or excess residual plating acid. Many desirable tin electrolytes include acids such as phenolsulfonic acid, sulfuric acid, fluoborate and alkyl sulfonic acids. When an excess of plating acid or fluxing compound is left on the strip due to insufficient rinsing before the flux, it causes a blue haze or over-etching effect. Tin plating lines whose electrolytes are based on phenol sulfonic acid (PSA) do not have a separate flux tank, but instead rely on a low post-plating rinse efficiency to leave an amount of residual PSA on the tinplate surface sufficient to operate as a flux.

However, due to a general migration from PSA to methane sulfonic acid (MSA), a more environmentally sustainable tin plating electrolyte, ex-PSA tin plating lines are typically found to be one rinse-tank short by having to lose one of their rinse-tanks by converting it to a flux tank, required for MSA operation. Insufficient rinsing after plating results in an excessive contamination of the flux solution and a higher propensity for reflow-melting defects, such as haze, over-etching and woodgrain. Accordingly, there exists a need for an improved flux method which inhibits tin oxide and hydroxide formation, acid etching and the formation of woodgrain.

SUMMARY OF THE INVENTION

Methods include providing a conductive substrate including tin or tin alloy; applying a flux composition including one or more organic compounds including one or more sulfonic acid groups, salts or anhydrides thereof in amounts of 0.1-20 g/L and one or more inorganic acids in amounts 0.1-10 g/L to the tin or tin alloy in area volumes of 0.5-10 ml/m$^2$; and homogenizing the flux composition on the tin or tin alloy. The method inhibits tin oxide and hydroxide on the tin or tin alloy, inhibits acid etching and reduces or prevents woodgrain formation.

DETAILED DESCRIPTION OF THE INVENTION

As used throughout this specification, the following abbreviations shall have the following meanings, unless the context clearly indicates otherwise: ° C.=degrees Centigrade; mol=mole; g=gram; ppm=parts per million; L=liter; ml=milliliter; m=meter; cm=centimeter; dm=decimeter; mm=millimeter; μm=micron; A=amps; ASD=amps/dm$^2$; dyne=1×10$^{-5}$ N; N=Newtons; and wt %=percent by weight. The terms "depositing" and "plating" are used interchangeably throughout this specification. "Halide" refers to fluoride, chloride, bromide and iodide. "Alkyl" refers to linear, branched and cyclic alkyl. The term "homogenize" means to make uniform. All percentages are by weight, unless otherwise noted. All numerical ranges are inclusive and combinable in any order, except where it is logical that such numerical ranges are constrained to add up to 100%.

Tin or tin alloy is deposited on a conductive substrate. Conventional methods and conventional tin and tin alloy plating baths may be used to deposit tin or tin alloy on the conductive substrate. Preferably tin is plated on the conductive substrate. Plating methods include, but are not limited to, barrel plating, rack plating and reel-to-reel high speed plating. A tin or tin-alloy layer may be deposited on the substrate by the steps of contacting the substrate with the tin or tin alloy bath and passing a current through the bath to deposit the tin or tin-alloy on the substrate. Current densities used to electroplate the tin or tin alloy may range from 0.1 A/dm$^2$ to 200 A/dm$^2$. When a low speed electroplating process is used, the current density may range from 0.1 A/dm$^2$ to 4 A/dm$^2$. When a high speed electroplating process is used the current density may range from 5 A/dm$^2$ to 200 A/dm$^2$. The tin and tin alloy may be deposited at conventional temperatures, typically, in the range of 15° C. to 70° C. In general, tin and tin alloy are electroplated on the substrate to a thickness of up to 2 μm, typically from 0.1 μm to 1.5 μm thick.

Substrates plated with the tin or tin alloy may include iron, nickel, zinc, carbon, cobalt, tungsten, chromium, zirconium, molybdenum, manganese, vanadium or mixtures thereof. Preferably the substrate includes iron with one or more of the foregoing elements. Such iron containing substrates include steel. In general, the steel is low carbon steel. Low carbon steel may contain from 0.02% to 0.3% carbon. Typically, such iron containing substrates are first cleaned with an alkaline cleaner to remove oils and grease prior to tin and tin alloy plating. Conventional cleaning processes may be used. Many conventional alkaline cleaners well known in the art used to prepare iron substrates for plating may be used. A commercially available cleaner is RONACLEAN™ alkaline cleaners (available from Rohm and Haas Electronic Materials, LLC, Marlborough, Mass.).

Sources of tin ions in the tin and tin alloy baths include, but are not limited to, one or more of tin salts, such as tin sulfates, tin halides, tin alkane sulfonates such as tin methane sulfonate, tin ethane sulfonate, and tin propane sulfonate, tin aryl sulfonate such as tin phenyl sulfonate and tin toluene sulfonate, and tin alkanol sulfonate. Mixtures of the various tin salts also may be used in the baths. Preferably tin sulfate or tin alkane sulfonates are used in the baths. More preferably tin alkane sulfonates are used, such as tin methane sulfonate, tin ethane sulfonate and tin propane sulfonate. Most preferably, tin methane sulfonate is used in the tin or tin alloy plating bath. When tin halide is used, the halide is typically chloride. The tin compounds useful in the baths are generally commercially available from a variety of sources and may be used without further purification. Alternatively, the tin compounds may be prepared by methods known in the literature. The amount of tin compounds used in the baths is any amount that provides a tin content in the range of 5 g/L to 100 g/L. When the baths are used in a low speed plating process, the amount of tin in the composition may range from 5 g/L to 60 g/L. When baths are used in high speed plating, the amount of tin may range from 5 g/L to 40 g/L.

The tin and tin alloy baths may also include one or more inorganic or organic acids or salts thereof. Such acids include, but are not limited to, inorganic acids such as sulfuric acid, hydrochloric acid, nitric acid and fluoroboric acid. Organic acids include, but are not limited to, alkane sulfonic acid, such as methane sulfonic acid, ethane sulfonic acid and propane sulfonic acid, aryl sulfonic acids, such as phenyl sulfonic acid and naphthyl sulfonic acids and salts thereof. Preferably the acids are sulfuric acid and alkane sulfonic acids and salts thereof. More preferably the acids are sulfuric acid and methane sulfonic acid and salts thereof. Most preferably, the acid is methane sulfonic acid and salts thereof. Such acids and their salts may be included in the tin and tin alloy baths in conventional amounts. Typically they are included in amounts of 20 g/L to 300 g/L.

One or more alloying metals include, but are not limited to, copper, nickel, bismuth, zinc, silver, indium and mixtures thereof. The choice of metals and the metal compounds and the amounts present in the alloy baths depends upon the tin-alloy to be deposited. Such amounts are well known to those of skill in the art. Preferably copper or nickel is used. Most preferably copper is used as the alloying metal with tin. Metal compounds include, but are not limited to, salts such as metal halides, metal sulfates, metal alkane sulfonates such as metal methane sulfonate, metal aryl sulfonates such as metal phenyl sulfonate and metal toluene sulfonate, and metal alkanol sulfonates. Preferably metal sulfates or metal alkane sulfonates are used. More preferably metal sulfates and metal methane sulfonates are used. Most preferably metal methane sulfonates are used.

Typically, the tin and tin alloy baths include one or more additives such as reducing agents, wetting agents, brightening agents, compounds which extend the current density range, such as carboxylic acids, and sludge agglomerates. Such optional bath additives may be included in conventional amounts.

After the tin or tin alloy layer is deposited on the conductive substrate, it is optionally rinsed at least once with water. Optionally it is dried. Preferably the tin or tin alloy layer is left wet.

The tin or tin alloy layer is treated with an aqueous acid flux composition. The aqueous acid flux prevents or inhibits formation of tin oxides, hydroxides, acid etching and woodgrain. The aqueous acid flux is applied to the tin or tin alloy layer in area volumes of 0.5-10 ml/m$^2$, preferably from 1-5 ml/m$^2$ and then dried in place. The flux may be applied to the tin or tin alloy layer by immersing the substrate with the tin or tin alloy into the flux solution, spraying the flux onto the deposit, applying via roller or applied using an aerosol. While the flux is still wet on the tin or tin alloy layer, it is homogenized by passing between one or more sets of wringer rolls to ensure that the components of the flux have a uniform distribution over the surface of the tin or tin alloy layer. Alternatively, the flux may be spray-applied between two sets of wringer rolls with appropriate compensation in fluid delivery rates to compensate for variations in line speed, the first thus ensures that the strip has a uniform thickness of rinse-water, and the second set ensures that the spray-applied flux is homogenously applied. Such parameters as fluid delivery rates and variation in line speed may vary from one apparatus to another. Accordingly, minor experimentation may be done to determine the appropriate fluid delivery rate to line speed.

When the flux composition is spray or roll-applied, there is no need to have a tank for the dip-application of the flux, thereby making an additional tank available for post-plating rinsing. Improved rinsing after plating reduces chemical consumption since all of the rinse water may be recovered, and may also typically improve the cleanliness of the metal substrate and thus the efficacy of the fluxing and reflow-melting operations.

The aqueous acid flux compositions include one or more organic compounds which include one or more sulfonic acid groups, salts, or anhydrides thereof in amounts of 0.1-20 g/L, preferably from 1-10 g/L. The organic sulfonic acid compounds, salts or anhydrides thereof may be aromatic or aliphatic. Such aromatic compounds may include hydroxyl benzene compounds and salts thereof having a general formula 1:

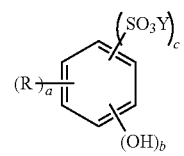

wherein Y is H, alkali metal ions, alkaline earth metal ions, transition metal ions, and ammonium ions, where a is 0, 1, 2, or 3, b is 1, 2, 3, 4, or 5, c is 1 or 2 and each R is independently selected from the group consisting of halogen, CN, COOY, $C_1$-$C_3$ alkyl, substituted $C_1$-$C_3$ alkyl, and $C_1$-$C_3$ alkoxy, wherein said alkyl substitutions are selected from the group consisting of straight chain or branched alkoxy, alkenyl, alkynyl, cycloalkyl, cycloalkenyl, acyl, phenyl, halosubstituted phenyl, heteroaryl, halogen, hydroxyl, cyano, or combinations of at least one of the foregoing. Such compounds include, but are not limited to, sulfosalicylic acid, phenol sulfonic acid, 1, 2-dihydroxybenzene-4-sulfonic acid, 1, 2-dihydroxybenzene-3, 5-disulfonic acid, 1, 4-dihydroxybenzene sulfonic acid, 1, 4-dihydroxybenzene-2-sulfonic acid, 1, 4-dihydroxybenzene-2, 5-disulfonic acid, 2,4-dihyroxybenzene sulfonic acid, salts and isomers thereof. Preferably the hydroxyl benzene compound is sulfosalicylic acid, 1,2-dihydroxybenzene-4-sulfonic acid, 1,4-dihydroxybenezene sulfonic acid and salts thereof. More preferably the hydroxyl benzene compound is sulfosalicylic acid, salts and isomers thereof.

Aromatic sulfonic acids may also include naphthalenesulfonic acids and salts thereof having a general formula 2:

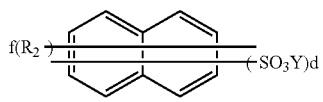

wherein Y is as defined above, d is 1, 2 or 3, $R_2$ is hydroxyl, and f is 1 or 2.

Such compounds include, but are not limited to, 1-naphthalenesulfonic acid, 2-naphthalenesulfonic acid, 1,5-naphthalenedisulfonic acid, 1,6-naphthalenedisulfonic acid, 2,6-naphthalenedisulfonic acid, 2,7-naphthalenedisulfonic acid, 1,3,5-naphthalenetrisulfonic acid and 1,3,6-naphthalenetrisulfonic acid and salts thereof. Preferably the naphthalene compound is 1-naphthalenesulfonic acid and salts thereof.

Such compounds may also include hydroxynaphthalenesulfonic acids and salts thereof. These compounds include, but are not limited to, 4-hydroxy-2-naphthalenesulfonic acid, 4-hydroxy-1-naphthalenesulfonic acid 5-hydroxy-1-naphthalenesulfonic acid, 8-hydroxy-1-naphthalenesulfonic acid, 2-hydroxy-1-naphthalenesulfonic acid, 6-hydroxy-2-naphthalenesulfopnic acid, 7-hydroxy-2-naphthalenesulfonic acid, 7-hydroxy-1-naphthalenesulfonic acid, 4,5-dihydroxy-1-naphthalenesulfonic acid, 6,7-dihydroxy-1-naphthalenesulfonic acid, 5-hydropxy-2,7-naphthalenedisulfonic acid, 8-hydroxy-1,6-naphthalenedisulfonic acid, 4-hydroxy-1,6-naphthalenedisulfonic acid, 4-hydroxy-1,5-naphthalenedisulfonic acid, 3-hydroxy-2,7-naphthalenedisulfonic acid, 7-hydroxy-1,3-naphthalenedisulfonic acid, 4,5-dihydroxy-2,7-naphthalenedisulfonic acid, 8-hydroxy-1,3,6-naphthalenetrisulfonic acid and 7-hyddroxy-1,3,6-naphthalenesulfonic acid and salts thereof, such as the alkali metal salts.

Aliphatic organic sulfonic acid compounds include, but are not limited to alkane sulfonic acids and salts thereof and alkanol sulfonic acids, salts and anhydrides thereof. Alkane sulfonic acids include monosulfonic acids, polysulfonic acids, salts and anhydrides thereof. Polysulfonic acids include, but are not limited to, alkanedisulfonic acids, alkanetrisulfonic acids, salts and anhydrides thereof. Monosulfonic acids include, but are not limited to, methane sulfonic acid, ethane sulfonic acid and propane sulfonic acid, salts and anhydrides thereof. Polysulfonic acids include, but are not limited to, methanedisulfonic acid, methanetrisulfonic acid, monochloromethanedisulfonic acid, dichloromethanedisulfonic acid, 1,1-ethanedisulfonic acid, 2-chloro-1,1-ethanedisulfonic acid, 1,2-dichloro-1,1-ethanedisulfonic acid, 1,1-propanedisulfonic acid, 3-chloro1,1-propanedisulfonic, salts and anhydrides thereof. Preferably, the aliphatic sulfonic acids are methanesulfonic acid, methanedisulfonic acid and salts thereof.

Preferably the acid flux compositions have a surface tension of 60 dynes or less, more preferably 40-60 dynes and most preferably from 45-55 dynes. Some minor experimentation may be required to determine the amount of a given surfactant needed to achieve the desired surface tension. To achieve the desired surface tension one or more surfactants may be included in the flux compositions in amounts to adjust the flux solution to the desired surface tensions. Such surfactants include non-ionic surfactants, anionic surfactants, cationic surfactants and amphoteric surfactants. Any of such surfactants may be used as long as the surfactants are themselves compatible with the tin or tin alloy plating bath. Preferably, the compositions include one or more non-ionic surfactants. The amount by weight of one or more surfactants may vary to achieve the desired surface tension.

Non-ionic surfactants include, but are not limited to, alkylene oxide compounds. Alkylene oxide compounds include, but are not limited to, ethylene oxide/propylene oxide ("EO/PO") copolymers, alkylene oxide condensation products of an organic compound having at least one hydroxy group and 20 carbon atoms or less, and compounds prepared by adding oxypropylene to polyoxyethylene glycol. Typically, the EO/PO copolymers have an average molecular weight in the range of from 500 to 10,000 g/mole, or such as from 1000 to 5000 g/mole. Most typically, the alkylene oxide compound is an EO/PO block copolymer.

Suitable alkylene oxide condensation products of an organic compound having at least one hydroxy group and 20 carbon atoms or less include those having an aliphatic hydrocarbon of from one to seven carbon atoms, an unsubstituted aromatic compound or an alkylated aromatic compound having six carbons or less in the alkyl moiety. The aliphatic alcohols may be saturated or unsaturated. Aromatic compounds may have up to two aromatic rings. The aromatic alcohols may have up to 20 carbon atoms prior to derivatization with ethylene oxide. Such aliphatic and aromatic alcohols may be further substituted, such as with sulfate or sulfonate groups. Such alkylene oxide compounds include, but are not limited to, ethoxylated polystyrenated phenol having 12 moles of EO, ethoxylated butanol having 5 moles of EO, ethoxylated butanol having 16 moles of EO, ethoxylated butanol having 8 moles of EO, ethoxylated octanol having 12 moles of EO, ethoxylated beta-naphthol having 13 moles of EO, ethoxylated bisphenol A having 10 moles of EO, ethoxylated sulfated bisphenol A having 30 moles of EO and ethoxylated bisphenol A having 8 moles of EO.

Non-ionic surfactants may include polyalkylene glycols. Such polyalkylene glycols include, but are not limited to, polyethylene glycol, and polypropylene glycol. Such polyalkylene glycols are generally commercially available from a variety of sources and may be used without further purification. Typically, the polyalkylene glycols useful in the compositions are those having an average molecular weight in the range of 200 to 100,000 g/mole or such as from 900 to 20,000 g/mole.

Examples of anionic surfactants are sulfated alkyl ethoxylates and sulfopropylated anionic surfactants. Examples of cationic surfactants are nitrogen salts such as quaternary ammonium salts, pyridinium salts, imidazolinium salts and higher alkyl amine salts. Such surfactants are described in U.S. Pat. Nos. 4,662,999 and 4,885,064. Such surfactants are included in amounts to provide the desired surface tension.

The components of the flux may be combined in any order using conventional mixing methods to provide a uniform aqueous flux composition. Once the flux composition is prepared, any undesired residue material is removed, such as by filtration, and then water is added to adjust the final volume of the composition. The flux composition may be agitated by any known means, such as stirring and ultrasonic mixing. The aqueous acid flux compositions have a pH of less than 7, preferably less than 1 to 6, more preferably 1 to 3.

The flux compositions are applied to the tin or tin alloy at temperatures from room temperature to 50° C. After treating the tin or tin alloy with the flux the substrate with the tin or tin alloy layer is dried by exposure to heated air and then reflowed by conduction or induction heating. Tin and tin-alloys may be reflowed at temperatures of 235° C. to 400° C., or such as from 240° C. to 280° C. Such reflow methods and conduction and induction heaters are well known in the art. This develops a $FeSn_2$ alloy layer and the tinplate product then displays improved tin or tin alloy adhesion, corrosion resistance and a bright finish which is attractive from a cosmetic standpoint. In addition, woodgrain is prevented or at least reduced in comparison to conventional methods. The substrate may then be further processed using conventional methods practiced in the industry.

The following examples are intended to further illustrate the invention but are not intended to limit the scope of the invention.

Example 1 (Comparative)

A full-scale trial was held on a tin line: the steel strip was cleaned with conventional alkaline cleaner to remove oils and grease. The steel was passed through three water rinses and then electrolytically pickled in an aqueous solution including 40 g/L sulfuric acid with an applied anodic current of 1800 A for a total of 2 seconds and rinsed prior to passing into a tin electrolyte for tin electroplating. The plurality of plating cells contained RONASTAN™ Tin Electroplate plating solution held at 40° C. which included methane sulfonic acid and stannous methane sulfonate. In order to evaluate the affectivity of the fluxing solution in producing both light and heavy coating weights with their concomitant concerns of woodgrain and gloss respectively, a differential coating was produced: the top-side was plated at a current density of 30.5 ASD to produce a coating weight of 5.4 $g/m^2$ of tin and the bottom was plated at 9 ASD to produce a coating weight of 5.4 $g/m^2$ at a line speed of 300 m/minute. The tin deposit on both sides of the steel strip was matte in appearance.

The tin plated steel strip was then rinsed with water by passing through two rinse tanks and an aqueous flux solution containing 4 g/L 5-sulfosalicyclic acid as the only additive was spray applied to both sides at a volume per unit area of 2 $ml/m^2$. The tin plated steel strip with the wet flux solution on the tin was then passed through a set of wringer-rolls to further homogenize the flux on the surface of the tin.

The tin plated steel strip was then dried by hot air blowers to remove the water from the applied flux solution, leaving a solid flux residue of 8 $mg/m^2$ 5-sulfosalicyclic acid distributed uniformly over the tin surface. The strip was then reflow-melted by passing sufficient current to cause the strip to heat up to a temperature of 240° C. and quenched in water held at 50° C. The top side of the strip (high coating weight) appeared acceptably bright, but haze was visible. The bottom side of the strip (light coating weight) was observed to display a heavy woodgrain texture.

Example 2 (Comparative)

The method described above was repeated except that the anodic current applied in the pickle was increased to 5400 A. The reason for this was to artificially highlight woodgrain defects so as to better enable visual detection of any possible improvements in woodgrain intensity that could be afforded by changes to the flux chemistry. After processing the top side of the strip remained unchanged (acceptably bright, but with haze), but the bottom side was now observed to display a heavy woodgrain texture.

Example 3

The method described in Example 2 was repeated except that after rinsing the tin plated steel strip was sprayed on both sides with a uniform aqueous flux solution containing 4 g/L 5-sulfosalicylic acid and 120 ppm of EO/PO copolymer with an average molecular weight of 1500 g/mol, and 0.5 ml/L of an sulfated alkyl ethoxylate (TRITON™ QS-15 copolymer surfactant available from The Dow Chemical Company, Midland, Mich.) as the only additives. The top side of the strip (high coating weight) appeared slightly brighter than Example 2 with slightly less haze and the bottom side (light coating weight) was observed to have a slightly less intense woodgrain defect.

Example 4

An addition of 2 g/L sulfuric acid was made to the flux solution from Example 3 and the experiment was repeated. The woodgrain appearance of the bottom side was observed to be significantly reduced in appearance and the brightness of the topside was observed to be improved as well as displaying less haze. The addition of sulfuric acid to the flux solution thus improved brightness, reduced haze and reduced woodgrain on the tin surface.

Example 5

A further addition of 1 g/L sulfuric acid was made to the flux solution from Example 4, now a total of 3 g/L sulfuric acid, and the experiment was repeated. The woodgrain appearance of the bottom side and the brightness of the topside were both observed to be further slightly improved.

Example 6

The method described in Example 5 was repeated except that the concentration of the sulfuric acid in the flux was increased to a total of 4 g/L. The woodgrain appearance of the bottom side was further improved, but the brightness of the top side was now observed to be marred by the general appearance of white over-etching stains. This was believed to be due to non-homogeneous distribution of the flux on the topside. The appearance of over etching stains highlights the necessity of ensuring a homogenous distribution of flux solution: excess solid flux residue in a localized area may lead to local over etching and insufficient flux may lead to reduction in relative brightness, effectively causing staining.

Example 7

The method described in Example 5 was repeated except that the anodic current applied in the pickle was reduced back to its standard level of 1800 A to match that of Example 1. The top side of the strip (high coating weight) appeared fully bright with no visible haze; the bottom side (light coating weight) was now observed to be free of woodgrain.

What is claimed is:

1. A method comprising:
   a) providing a conductive substrate comprising tin or tin alloy;
   b) providing a flux composition consisting of one or more organic compounds chosen from aliphatic sulfonic acids, salts or anhydrides thereof, sulfosalicylic acid, salts and isomers thereof in amounts of 0.1-20 g/L and one or more inorganic acids in amounts of 0.1-10 g/L, one or more surfactants and water;
   c) applying the flux composition to the tin or tin alloy in area volumes of 0.5-10 ml/m$^2$; and
   d) homogenizing the flux composition on the tin or tin alloy.

2. The method of claim 1, wherein a surface tension of the flux composition is 60 dynes or less.

3. The method of claim 2, wherein the surface tension of the flux composition is 40-60 dynes.

4. The method of claim 1, wherein the one or more surfactants are chosen from non-ionic surfactants.

5. The method of claim 1, wherein the flux composition is applied to the tin or tin alloy by immersion, spraying or atomization.

6. The method of claim 1, wherein the tin or tin alloy is free of woodgrain.

* * * * *